United States Patent [19]

Parker

[11] 3,999,266
[45] Dec. 28, 1976

[54] STRUCTURE INCORPORATING A DIAPHRAGM AND METHOD OF MAKING SAME

[76] Inventor: Leland L. Parker, 1018 W. Ontario, Corona, Calif. 91720

[22] Filed: June 18, 1975

[21] Appl. No.: 587,880

Related U.S. Application Data

[63] Continuation-in-part of Ser. No. 428,402, Dec. 26, 1973, abandoned.

[52] U.S. Cl. .......................... 29/157.1 R; 29/446; 92/98 R; 92/98 D; 92/100; 156/294
[51] Int. Cl.² .................... F01B 19/02; F16J 3/02
[58] Field of Search .......... 29/157.1 R, 157 R, 446; 92/98 R, 98 D, 99, 100, 105; 156/69, 294

[56] References Cited

UNITED STATES PATENTS

| | | | |
|---|---|---|---|
| 2,933,428 | 4/1960 | Mueller | 156/294 |
| 3,293,992 | 12/1966 | Baumann | 92/99 |
| 3,345,725 | 10/1967 | Peters | 29/446 |
| 3,421,732 | 1/1969 | Golden | 92/98 R |
| 3,463,691 | 8/1969 | Martin | 156/294 |
| 3,593,956 | 7/1971 | McCarty, Jr. | 92/98 R |
| 3,613,518 | 10/1971 | Prosser | 92/98 D |
| 3,762,280 | 10/1973 | Kreuter et al. | 92/98 D |
| 3,775,216 | 11/1973 | Frentrop | 156/294 |
| 3,788,928 | 1/1974 | Wise | 156/294 |

FOREIGN PATENTS OR APPLICATIONS

793,707   4/1958   United Kingdom ............ 92/98 R

Primary Examiner—C.W. Lanham
Assistant Examiner—Dan C. Crane
Attorney, Agent, or Firm—John H. Crowe

[57] ABSTRACT

A method of permanently uniting two cylindrical members with mating end edges which cooperate to define a circumferential groove that is closed except for a continuous inner circumferential slot defined by the end edges. In the method, the mating end edges of the two members are brought together to imprison the peripheral bead of a flexible diaphragm under axial compression in the circumferential groove so that the web of the diaphragm extends through the continuous circumferential slot. The two cylindrical members are then held together under pressure while a cap with a cylindrical skirt is telescoped onto one member past the joint between its mating edge and that of the other member. Prior to this telescoping step, the inner wall of the skirt is coated with a suitable adhesive to provide an adhesive layer between the confronting skirt and cylindrical wall areas of the final assembly. The two cylindrical members are maintained under pressure until the adhesive sets, after which the pressure is released. The cylindrical members are now held tightly together, with the bead of the diaphragm under axial compression in the circumferential groove formed by their mating end edges, by the adhesive bond between them and the cap.

8 Claims, 4 Drawing Figures

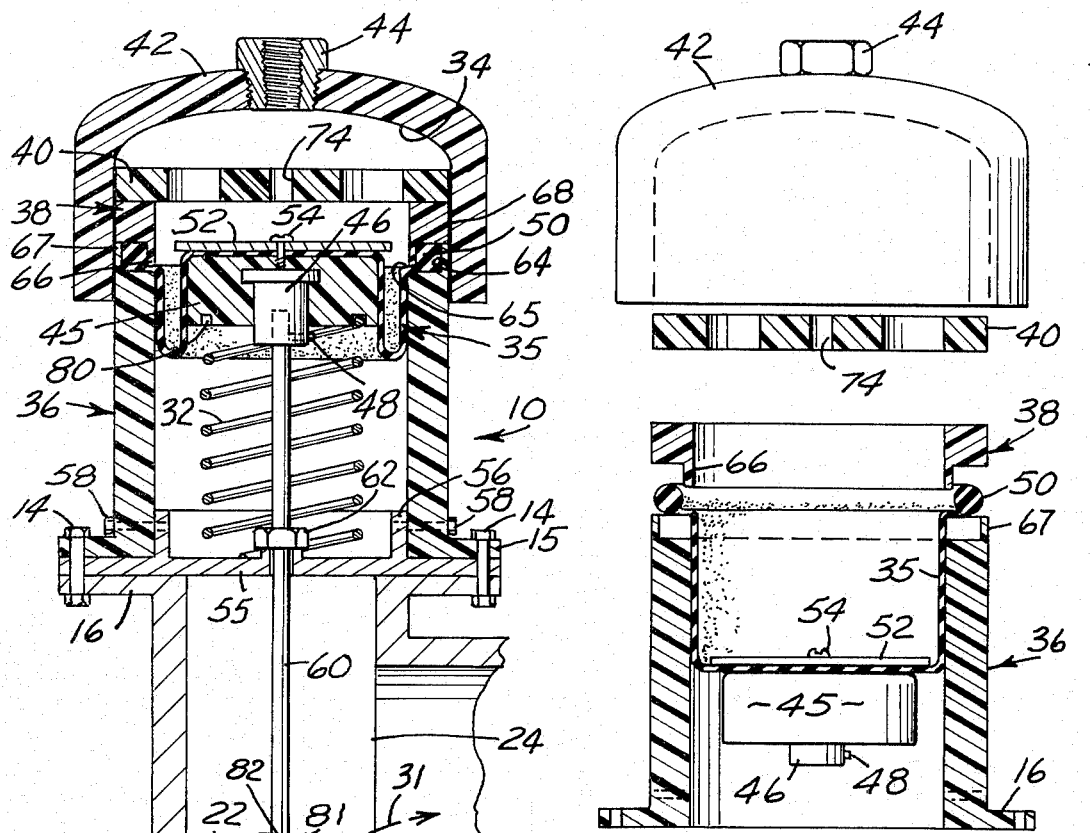
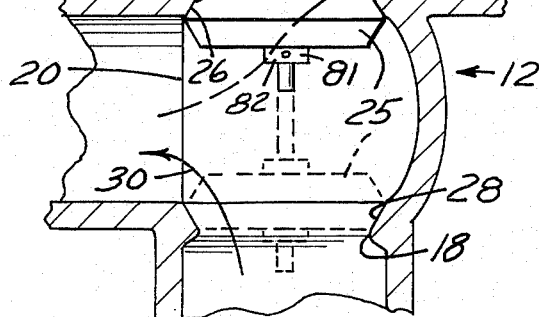
FIG. 1.
FIG. 2.
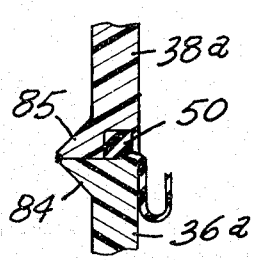
FIG. 4.
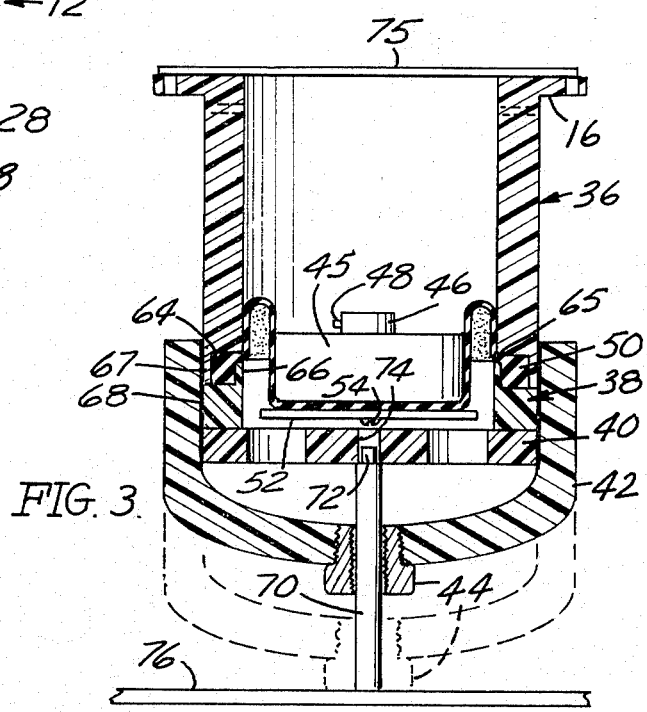
FIG. 3.

STRUCTURE INCORPORATING A DIAPHRAGM AND METHOD OF MAKING SAME

CROSS-REFERENCE TO RELATED APPLICATION

This application is a continuation-in-part of my co-pending U.S. application Ser. No. 428,402, filed Dec. 26, 1973, now abandoned.

BACKGROUND OF THE INVENTION

In the employment of a fluid-pressure-responsive control device employing a diaphragm to sense pressure changes, it is common practice to place the peripheral bead of the diaphragm between two cylinder members that have radial flanges at their confronting ends and to tighten the two flanges together by means of numerous screws or bolts to compress the peripheral bead of the diaphragm. One disadvantage of such a construction is the relatively large expense in the machining required to fabricate the parts and to install and tighten the numerous screw fasteners. Another disadvantage is that the construction cannot be relied upon to be leak free over a long service life.

The need for improvement is this regard is especially apparent in the construction of valve actuators that are now increasingly employed for the automatic control of drip irrigation systems. In a drip irrigation system, water is released at ground level at a trickle rate through orifices that are exceedingly small in diameter, the diameter of such an orifice being commonly as small as 0.0058 inch. For such a system to operate in a trouble-free manner, it is mandatory to use large filters to remove foreign particles and clogging materials such as algaes from the water supply. A granular filter bed in a large filter tank used for this purpose becomes progressively clogged with foreign matter and must be periodically back-washed. It is common practice to use an automatic system which carries out a back-wash cycle whenever the pressure drop across the filter bed rises to a predetermined magnitude. A 3-way valve is employed for this purpose which normally directs the water supply in one direction through the filter bed but which, when required, operates to permit reverse flow through the filter bed for a short period of time, to agitate the filter bed and flush away the accumulated debris.

The present invention is directed to the problem of fabricating an actuator for such a 3-way valve wherein a diaphragm responsive to changes in pressure in a control chamber is operatively connected to a valve member that is movable between two limit positions.

SUMMARY OF THE INVENTION

Principal objects of the invention are to provide a simple method of assembling a novel, leak-proof valve actuator of the type including a diaphragm mounted to span a cylindrical chamber and respond to changes in control pressure in the chamber; to provide such a method productive of an actuator with a leak-free joint for retaining the rim of the diaphragm, which joint, unlike a conventional one, tightens, for increased effectiveness, with increasing fluid pressure in said chamber; to provide means of assembling such a valve actuator of simple, rugged construction that may be relied upon for long, trouble-free service; to provide means for producing such a valve actuator in quantity at relatively low cost; to provide such a method of assembly requiring minimal capital investment for molds, equipment, and the like; and to provide a combination of such a valve actuator and a 3-way valve in which the valve is automatically controlled by the actuator.

The present invention is particularly directed to a novel construction for a valve actuator of the above-indicated type in which the mating edges of two hollow cylindrical members cooperate with one another to define a circumferential groove that is closed except for a continuous inner circumferential slot, also defined by the mating edges of the cylinders. The bead of the diaphragm is enclosed in the circumferential groove under suitable axial compression and the web of the diaphragm extends radially inwardly through the inner circumferential slot. The outer circumferential portions of the mating edges of the two cylinders are held firmly together, by means hereinafter disclosed, around the circumference of the actuator chamber.

The features and advantages of the invention may be understood from the following detailed description of the preferred embodiment, taken with the accompanying drawings.

BRIEF DESCRIPTION OF THE DRAWINGS

FIG. 1 is a sectional view of the presently preferred valve actuator embodiment of the invention;

FIG. 2 is an exploded sectional view showing how certain parts of the valve actuator fit together;

FIG. 3 is a sectional view showing a preferred method of fabricating the valve actuator; and FIG. 4 is a fragmentary sectional view of a modification of the invention.

DESCRIPTION OF THE PREFERRED EMBODIMENT

In FIG. 1, a valve actuator, generally designated 10, embodying the presently preferred embodiment of the invention, is mounted on a 3-way valve, generally designated 12, by suitable bolts 14 which extend through a bottom flange 15 of the valve actuator and through a top flange 16 of the 3-way valve. The valve actuator 10 may be sold separately or may be sold as an assembled part of a 3-way valve as shown in FIG. 1.

The 3-way valve 12, which is of conventional construction, has a lower inlet port 18 for connection to a pressurized water source (not shown), a lateral port 20 for connection to a filter tank (not shown) and an upper port 22 through which fluid may flow to the exterior of the valve through an opening 24 in the valve body wall. A valve member 25 operated by the valve actuator 10 is movable between an upper limit position shown in FIG. 1 against an upper valve seat 26 to close the valve port 22 and an alternate lower position indicated by dotted lines where the valve member spans a lower valve seat 28 to cut off the inlet port 18.

When the 3-way valve 12 is in service, the valve member 25 is normally in its upper position to cause water to flow from the inlet port 18 through the lateral port 20 to the filter tank as indicated by the solid arrow 30. To carry out the backwash operation, however, valve member 25 is dropped to its lower limit position to cut off the inlet port 18 and backwash water enters the filter tank through plumbing means (not shown) to cause reverse flow from the filter tank through the lateral port 20 and the upper port 22, as indicated by the dotted arrow 31, to the discharge opening 24 of the valve.

Normally the valve member 25 is held in the upper position shown in FIG. 1 by the pressure of a spring 32, but the valve member may be moved to its alternate lower position for a backwash operation by fluid pressure in an upper control chamber 34 exerted against a diaphragm 35. Pressurized fluid for such control purposes may be drawn from the same high pressure water source that is connected to the inlet port 18 of the valve.

The principal parts of the valve actuator 10 shown in FIG. 1 further include: a cylindrical body formed by a first cylinder member 36 and a second cylinder member 38 in the form of a ring joined thereto in edge-to-edge relationship; an apertured pressure disk 40 which abuts the upper end of the ring 38; a cap 42 provided with a pipe fitting 44 for connection to a source of pressurized fluid; a piston 45 which may be made of hard rubber with an embedded fitting 46; a flexible rolling diaphragm having a peripheral bead 50 confined between the confronting ends of the cylindrical member 36 and the ring 38; a retainer disk 52 of suitable metal which holds the diaphragm against the piston and is secured to the piston by a suitable selfthreading screw 54 that penetrates the fitting 46; a bottom plate 55 seating the spring 32 and formed with an inner cylindrical flange 56 that telescopes into the lower cylinder 36 and is secured thereto by radial bolts 58; a valve stem 60 connecting the valve member 25 to the fitting 46 of the piston 45; and a gland 62 which is mounted on the bottom plate 55 and slidingly embraces the valve stem 60 for guidance of the same.

A feature of the invention is that the bead 50 of the diaphragm 35 is retained and axially compressed in a circumferential groove 64 that is formed by the mating ends of the cylinder member 36 and the ring 38, the groove being closed except for an inner circumferential slot 65 through which the web of the diaphragm extends. In the construction shown in FIGS. 1 and 2, the inner side wall of the circumferential groove 64 is formed by a cylindrical flange 66 of the upper ring 38, the edge of the flange forming one edge of the continuous inner circumferential slot 65 through which the diaphragm web extends. The outer circumferential wall of the circumferential groove 64 is formed by an outer cylindrical flange 67 extending from the upper end of the lower cylinder member 36 and abutting the end of the ring 38 to fix the axial dimension of the circumferential groove 64 and thereby determine the extent to which the diaphragm bead 50 is axially compressed in the groove.

A feature of the invention is the concept of providing means for permanently holding the outer circumferential portions of the mating ends of the cylinder member 36 and the ring 38 together in a continuous manner around their circumferences in such a way as to form a fluid-tight joint between the members. The outer circumferential portions of the confronting ends of the cylinder 36 and ring 38 may be so fastened in a fluid-tight manner in various ways in various practices of the invention.

In the construction shown in FIG. 1, the outer circumferential portions of the confronting ends of the cylinder member 36 and the ring 38 are fastened and held together by a layer 68 of a suitable glue or adhesive (or a layer of material formed by the use of a suitable solvent cement in the manner indicated below). The layer 68 coats the inner circumferential surface of the cap 42 and the outer circumferential surfaces of the cylinder member and at the ring as well as the outer circumferential surface of the pressure disk 40.

An important feature of the present invention resides in the concept of fabricating the described valve actuator 10 by a procedure of the general character set forth below.

The first step may be to anchor the diaphragm 33 to the piston 45, by means of the retainer disk 52 and the screw 54, in the manner shown in FIG. 2. The parts are then assembled in upside-down position, as shown in FIG. 3, where the cylinder member 36 and the ring 38 cooperate to retain the bead 50 of the diaphragm and the pressure disk 40 abuts the opposite end of the ring 38. A temporary pressure rod 70 is then inserted through the fitting 44 of the cap 42 as shown, with a reduced end 72 of the pressure rod seated in an axial bore 74 of the pressure disk. The temporary pressure rod 70 is then employed in any suitable manner to place the cylinder member 36 and ring 38, and the pressure disk 40, under axial compression. For example, an arbor press or the like (not shown) may be employed to apply downward pressure to an upper backing plate 75 and simultaneously apply upward pressure to a lower backing plate 76. At this time the cap 42 is allowed to rest on the lower backing plate 76 for full exposure and accessibility of the outer circumferential surfaces of the cylinder member 36 and ring 38 and pressure disk 40. A coating of suitable adhesive is then applied to the outer circumferential surfaces of the compressed assembly and/or the inner circumferential surface of the cap 42. The cap 42 is then elevated to its final assembled position as shown in solid lines in FIG. 3, and the interposed adhesive 68 is allowed to set while the assembly is still under pressure. This pressure, it is important to note, urges the cylindrical flange 67 of cylindrical member 36 against the ring 38 to provide a seal against intrusion of the adhesive into the circumferential groove confining the bead 50 of the diaphragm. Intrusion of the adhesive into that groove would prevent the bead of the diaphragm from shifting in the groove to accommodate itself to changes in the magnitude and direction of the tensioning of the web of the diaphragm, which shifting movement is essential for properly effective functioning of the diaphragm.

After the adhesive has set, it is a simple matter to release the actuator assembly from axial pressure and withdraw the temporary pressure rod 70. The actuator parts can be assembled in upside-down position, as illustrated in FIG. 3, rather than right-side-up position as illustrated in FIG. 1, to avoid adhesive drips and runs on the outer surface of cylinder members 36. When the parts are assembled in their FIG. 3 (upside-down) positions, such adhesive drips or runs are on the inner surface of cap 42, where they are out of sight and can do no esthetic harm.

To complete the assembly of the structure shown in FIG. 1, the valve stem 60 is inserted through the gland 62 and the gland is tightened sufficiently to serve as a guide for the valve stem and to prevent the passage of fluid. The spring 32 is then placed loosely over the upper end of the valve stem 60 and the upper end of the valve stem is anchored to the piston 45, for example by means of a set screw 48 in the piston fitting 46. Next, the spring 32 is placed under compression between the bottom plate 55 and the piston 45 with the upper end of the spring seated in a circular groove 80 on the underside of the piston, and plate 55 is secured to cylinder member 36 by a plurality of bolts 58. The valve actuator structure may then be mounted on the 3-way valve 12 by means of the circumferential series of bolts 14.

Finally, the valve member 25 may be introduced into the interior of the 3-way valve 12 through the lateral port 20 to permit the valve member to be fixedly mounted on the valve stem 60, for example by means of two collars 81 fitted with set screws 82.

FIG. 4 illustrates a modified form of the invention, in which the cylinder members 36a and 38a are made of a suitable fusible material and the outer circumferential portions of the confronting ends of the two cylinder members are formed with tapered radial flanges 84 and 85, respectively, that meet face-to-face. With the assembly under axial compression, the two flanges 84 and 85 are fused together at their outer edges to firmly unite the two cylinder members and to form a fluid-tight seal that is continuous around the circumference of the members. When the assembly is under axial compression, the confronting surfaces of the flanges 84 and 85 are pressed together to function as an effective seal to prevent intrusion of the fusion material into the circumferential groove that retains the bead 50 of the diaphragm. Since no fusion material is permitted to enter the dircumferential groove, the bead of the diaphragm is free to shift in the groove and accommodate itself to changes in the magnitude and direction of the tensioning of the web of the diaphragm adjacent the bead.

In one way of fusing the outer edges of the flanges 84 and 85 together, a highly heated minute stream of air may be used to produce a continuous weld when the cylinder members are made from a thermoplastic material. Another permissible modification of the herein-disclosed method of forming my actuator housing involves the friction welding of cylindrical members corresponding to members 36 and 38 of the cylindrical body of actuator 10. This friction welding can be accomplished by spinning one of the members, while it is held in tight engagement and axial alignment with the other, until the two members soften at the resulting joint (as a result of friction heat), and weld themselves together. Where this method of forming the cylindrical body of the valve actuator is employed, no pressure disk corresponding to pressure disk 40 of actuator 10 is required, and no such disk will therefore be employed or form a part of the finished actuator.

In the joint construction of this invention, the two confronting rims of the cylinder members meeting to form the joint have respective surfaces disposed radially outwardly of the bead-confining groove that are brought together under pressure during the bonding operation for the purposes of determining the clearance of the circumferential entrance slot of the bead-confining groove, determining the axial dimension of the groove so that the groove compresses the bead of the diaphragm axially to be predetermined degree, and causing the respective surfaces to cooperate under axial pressure during the bonding operation to serve as a seal to prevent the intrusion of bonding material into the groove during the bonding operation. In the embodiment of the invention shown in FIGS. 1 and 3, the mating surfaces are the end surface of the flange 67 of the lower cylinder member 36 and the confronting surface of the ring 38. In the joint construction of that embodiment, the bead-confining, as made clear above, circumferential groove is formed between a ring and one of two hollow members and the other hollow member overlaps the outer annular surface of the ring and a portion of the outer annular surface of the one hollow member. The one hollow member and ring are bonded firmly to the other hollow member at the annular interface therebetween in the region of the overlap to integrate the three members into a single body and thereby set the stage for the creation of a desirable bending moment in the upper wall of the actuator housing that tends to cause the joint to close, rather than open, under the influence of internal fluid pressure. Where the involved members are made of a suitable plastic, as illustrated in the drawing, good flexibility to favor the closing of the joint by the bending moment is achieved in the actuator housing.

While the novel valve actuator of this invention has been herein described and illustrated in what are believed to be preferred embodiments, it will be understood by those skilled in the art that various departures may be made therefrom within the scope of the invention. In an example of one such departure, a cylinder member and ring corresponding to cylinder member 36 and ring 38 of actuator 10 can be formed so that the wall of the ring is thicker than that of the cylinder member, whereby the depending flange of the ring, corresponding to flange 66 of ring 38, is offset radially inwardly with respect to the cylindrical wall of the member 36. With such an arrangement, the depending flange can extend axially downwardly farther than flange 66 to the vicinity of the upper rim of the cylinder member and still leave room for the web of the diaphragm to fit between the ring and cylinder member. Also, with such an arrangement, the inner edge of the upper rim of the cylinder member can be rounded into a "blend radius" and the depending flange can be rounded at its lower end, as seen in cross section, to eliminate contact between sharp edges on the ring and cylinder member and the diaphragm and thereby minimize wear on the diaphragm.

It is within the scope of my invention to employ, in lieu of pressure disk 40 in actuator 10, a pressure disk with a concentrically indented lower portion adapted to fit snugly into the opening in ring 38 and an upper portion of a diameter intermediate the inside diameter of the cylindrical portion of cap 42 and the diameter of the opening in ring 38. Such a pressure disk would be held properly in position in the actuator by virtue of the snug fit of its indented lower portion in the ring 38 opening. In another permissible form, the pressure disk could be similar to that just described, except with only one aperture (this being in the center for purposes of receiving the pressure rod 70) but having at least two portions of its periphery cut off along parallel chords in such fashion as to provide fluid passegeways past the pressure disk within the actuator housing.

The method of assembly of my novel actuator can vary from that specifically described above, so long as the modified method fits within the broad concept of my assembly technique as taught herein. Thus, for example, pressure can be brought to bear on the cylinder member and ring parts of actuator 10, or its equivalent, while a permanent joint is being formed therebetween, by means of a pressure rod with a radially stepped portion intermediate a radially enlarged upper segment and a radially reduced lower segment with a threaded lower end, so designed that the radially stepped portion fits snugly into the center opening in pressure disk 40, or its equivalent, to bring the annular shoulder at the lower end of the enlarged upper segment of the rod against the upper surface of the pressure disk. The pressure rod must be of sufficient length to extend through the actuator so that its lower, threaded end projects outwardly from the bottom of the assembled actuator when the rod is positioned for use. Such a rod can be employed in conjunction with a radially shouldered plate having a reduced portion sized to fit snugly within the bottom opening of the cylinder 36, or its equivalent, which plate has a center opening sized to permit snug passage of the lower, threaded end of the pressure rod. The upper, radially enlarged segment of the pressure rod is sized to fit through the fitting 44 of cap 42, or an equivalent opening in an actuator cap. In the preferred technique of using such a pressure rod in the method of this invention, the ring and cylinder member forming the joint of the assembled actuator housing are brought together with the bead of the diaphragm in the circumferential groove formed by their mating ends. Retainer disk 52, or its equivalent, is properly positioned against the diaphragm so that its center opening is aligned with a center opening in the diaphragm (both of which openings are sized to permit entry of the lower, reduced segment of the pressure rod) and pressure disk 40, or its equivalent, is disposed with its center opening in axial alignment with the ring and cylinder member. Next, the lower, reduced segment of the pressure rod is threaded downwardly through the center openings of the pressure disk, retainer disk and diaphragm, until the lower end of its enlarged segment abuts the top surface of the pressure disk. During this step, or thereafter, the shouldered plate referred to above is mated with the lower end of the cylinder member, and a nut is tightened against this plate on the threaded lower end of the pressure rod. The nut is tightened until the abutting rims of the ring and cylinder member are brought hard against each other, and the bead of the diaphragm is properly compressed in the circumferential groove formed therebetween. A suitable adhesive, or the like, can now be applied to the inner cylindrical wall of the cap and/or the appropriate outer wall surfaces of the ring and cylinder member, after which the cap can be telescoped over the ring and cylinder member to bond the cooperating parts of the actuator housing together. After the adhesive, or equivalent, bond is formed, the nut can be loosened from the pressure rod, and the rod removed through the opening in fitting 44 of the cap, or other equivalent cap opening.

In summary, the scope of the present invention extends to all variant forms thereof encompassed by the language of the following claims.

What I claim is:

1. A method of assembling a housing from a pair of cylindrical members of substantially equivalent outer diameter having a pair of circular rims adapted to meet continuously therearound and a third member with a cylindrical skirt adapted to slidably receive the pair of members, when they are aligned with their rims in meeting engagement, to a sufficient extent to create an interface between said third member and said pair of members either side of the meeting rims of the latter, said method comprising the steps of:

bringing said pair of members together in alignment so that said rims are properly positioned for meeting engagement;

applying continuous axial pressure to the pair of members in alignment of sufficient magnitude to hold the members firmly in positions of meeting engagement;

applying a flowable bonding material adapted to form a hard bond to at least one of the subject members in a way to insure occupancy of the area corresponding to the area of said interface therebetween by said bonding material when the members are slidably engaged as indicated below;

slidably engaging said third member and said pair of members, while the latter are held together under said axial pressure, until said interface is formed;

allowing said bonding material to form said hard bond to thereby firmly secure the members together throughout the area of said interface; and releasing the pressure on said pair of members;

whereby an integrated assembly of the pair of members and said third member is provided in which the pair of members is maintained in tight contact around said rims and said third member is sealed firmly to the pair of members throughout the interfacial area therebetween by said hard bond;

said housing having a flexible diaphragm spanning its interior to respond to fluid pressure changes on one side thereof, said flexible diaphragm consisting of a web with a peripheral bead of greater thickness than said web and having said bead axially compressed against leakage in a circumferential groove with a circumferential entrance slot for said web comprising a joint between said pair of cylindrical members; and the rims of said pair of cylindrical members being shaped to abut around annular outer segments and form said circumferential groove and circumferential entrance slot radially inwardly of said outer segments;

said method including the step of positioning said diaphragm so that its bead is axially compressed in said circumferential groove, with its web extending through said circumferential entrance slot, after said pair of members are brought together so that said rims are in line for said meeting engagement and pressure is applied to the members to hold the rims in said engagement;

whereby the axial pressure of said pair of cylindrical members causes sealing compression of the bead of said diaphragm in said circumferential groove, the degree of compression and width of the entrance slot being determined by the shapes of said rims of said cylindrical members, before the bonding material has formed said hard bond, after which the bond continues to hold the bead under substantially the same degree of compression; and whereby the pressure holding the abutting angular outer segments of said rims tightly together prevents leakage of the flowable bonding material into said circumferential groove, which leakage would hinder shifting movement of said bead under changing pressure conditions subsequently occurring within said housing, until said material forms said hard bond.

2. A method in accordance with claim 1, in which said third member had a domed closure, with a central opening to admit a fluid under pressure, integral with its cylindrical skirt, the closure having a flattened circular axial cross-sectional shape, whereby fluid pressure acting within the space enclosed by the diaphragm at one end and the domed closure at the other end within said housing causes a bending moment in the cylindrical housing walls that tends to close said joint for more effective sealing of the joint against leakage.

3. A method in accordance with claim 2 in which said pair of cylindrical members and said third member are of plastic construction to insure good flexibility in the housing walls for enhancement of the joint closing tendency of said bending moment.

4. A method in accordance with claim 3 in which said housing comprises an actuator for use in the control of a 3-way valve for a filter bed in a water irrigation system in which it is installed with the domed closure of said third member up.

5. A method in accordance with claim 4 in which the outer annular segments of the rims of said pair of cylindrical members adapted to abut when said rims are brought into meeting engagement consist of the top edge of an upstanding annular flange around the outer portion of the rim of the lower cylindrical member and a cooperating outer annular segment of the downfacing rim of the upper cylindrical member.

6. A method in accordance with claim 5 in which the circumferential entrance slot to said circumferential groove is defined by the bottom of a depending annular flange from the inner portion of the rim of said upper cylindrical member and a cooperating inner annular portion of the rim of the lower cylindrical member.

7. A method in accordance with claim 6 including the step of fastening said diaphragm to said 3-way valve for control of the latter by the diaphragm in response to pressure changes in a fluid confined between the diaphragm and said domed closure.

8. A method in accordance with claim 6 in which said bonding material is a suitable adhesive.

* * * * *